Oct. 18, 1927.  S. A. WILDE  1,645,784
GAS RANGE
Filed Jan. 24, 1927  2 Sheets-Sheet 2

INVENTOR:
Samuel A. Wilde
By
ATTORNEYS.

Patented Oct. 18, 1927.

1,645,784

UNITED STATES PATENT OFFICE.

SAMUEL A. WILDE, OF TAUNTON, MASSACHUSETTS, ASSIGNOR TO GLENWOOD RANGE COMPANY, OF TAUNTON, MASSACHUSETTS, A CORPORATION OF MASSACHUSETTS.

GAS RANGE.

Application filed January 24, 1927. Serial No. 162,969.

Present day methods of living necessitate the use of an incinerator for burning kitchen waste and other refuse. The object of the invention is to provide an arrangement whereby such an incinerator may form part of the equipment of a gas stove or range. In the same connection it is my further object to provide means whereby the contained incinerator will not in any way interfere with the other parts of the stove, being arranged in an out of the way position with relation to them, and apart from its purpose as an incinerator will function also to supply heat to other parts of the stove requiring heat or even be used for heating the room in which the stove is located.

Gas stoves as now commonly constructed comprise an oven chamber, a chamber associated with the oven chamber containing a burner for heating the oven (and such may well be a broiler chamber), a hot chamber in which food may be kept hot, and various open burners commonly arranged in a burner chamber beneath a stove top for heating it, or over which burners cooking utensils may be placed for receiving direct heat from the burners. It is my object to provide an arrangement whereby the incinerator apart from its ordinary fuction of destroying refuse matter, may perform the additional function of supplying heat by an application of heated air to the various parts of the stove just mentioned where such application is desirable and which heated air may also be used for heating the room in which the stove is located, either when the other parts of the stove are in use or not in use.

The invention can best be seen and understood by reference to the drawings, in which—

Referring to the drawings:—

Figure 1:
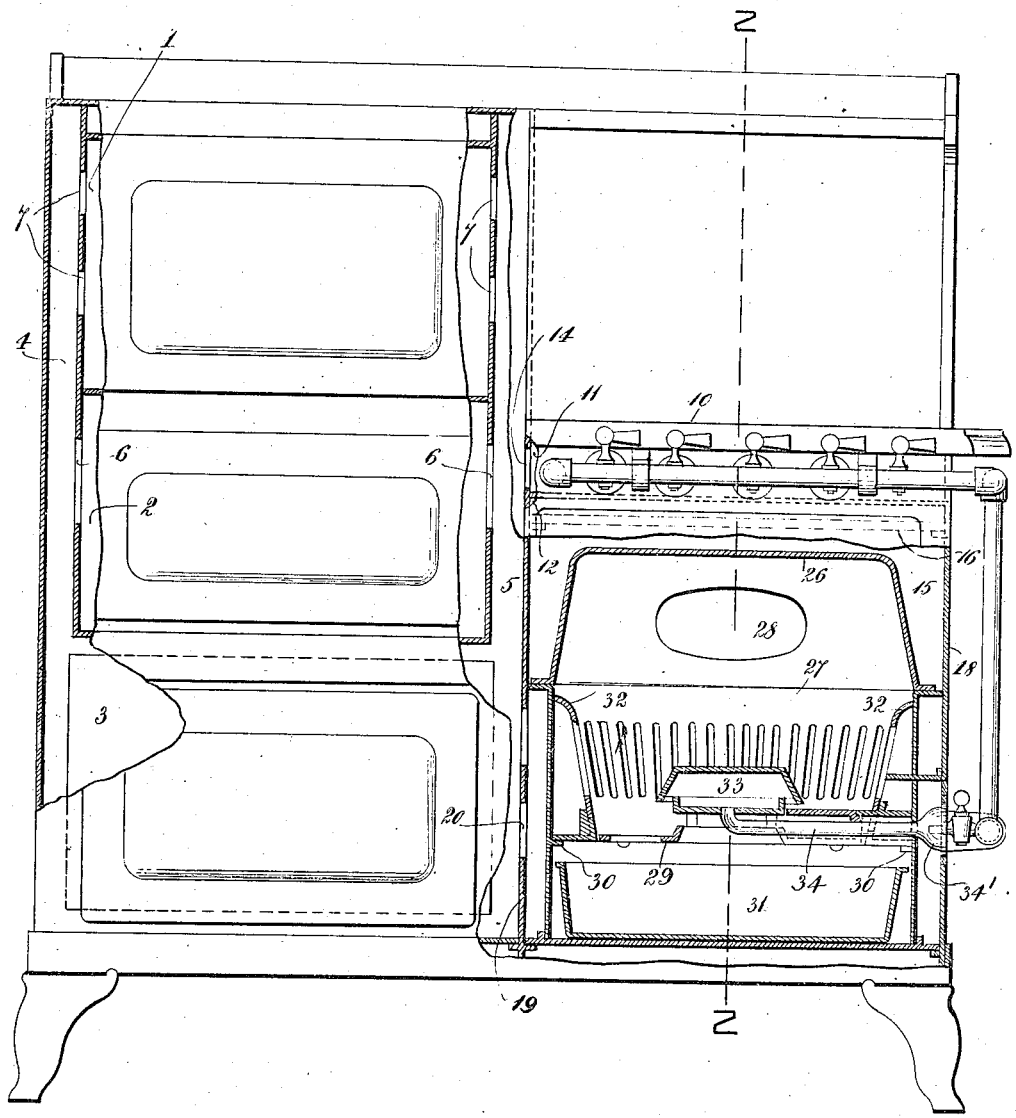
Figure 1 is a front elevation of the stove shown partly in section.
Figure 2:
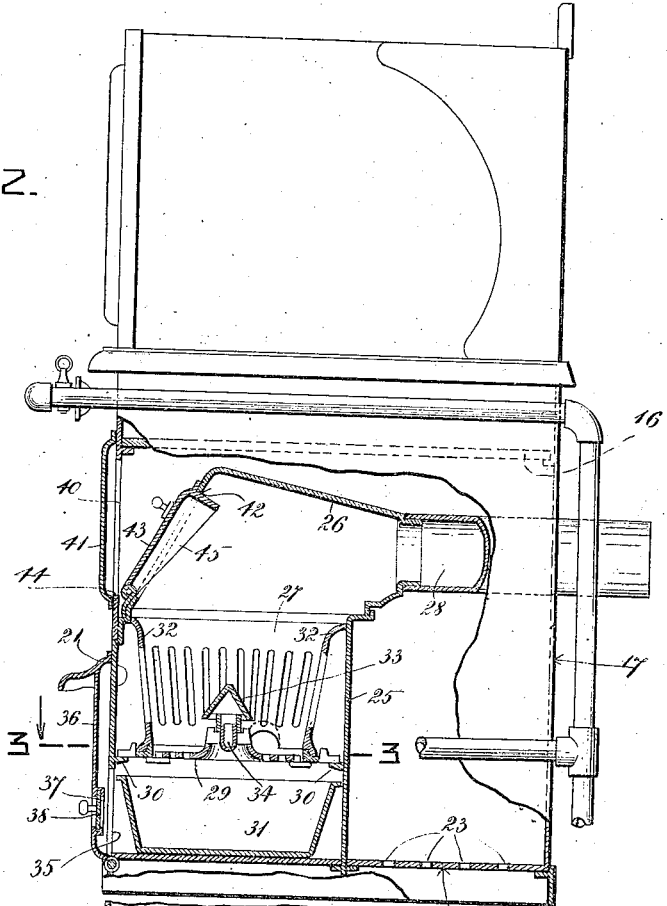
Fig. 2 is a section on the line 2—2 of Fig. 1.
Figure 3:
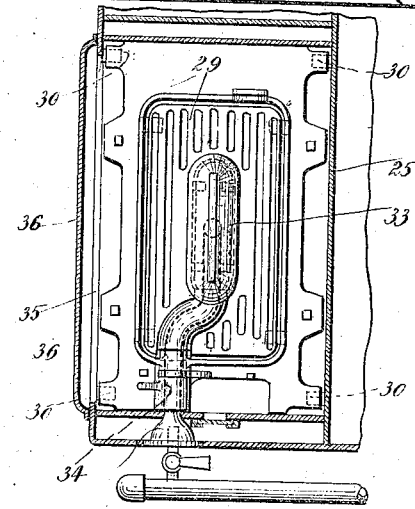
Fig. 3 is a section on the line 3—3 of Fig. 2.

The general structure of the stove or prearrangement of its various parts comprises an upper chamber 1 which is the oven chamber. Below this chamber or oven is a chamber 2 which contains the usual burner (not shown) by which heat is supplied for heating the oven. Below the chamber 2 is a hot chamber 3 for containing food desired to be kept hot. All these chambers lie superposed one above the other. Extending from the top of the hot chamber 3 and by the chambers 1 and 2 on either side thereof are flues 4 and 5, respectively. Hot air admitted to the chamber 3 will pass upwardly through these flues. Heat from the chamber 2 or burner chamber will enter the flues by way of openings 6 in the respective side walls of the chamber. The flues 4 and 5 connect with the oven chamber 1 by way of openings 7 in the side walls of this chamber or oven and it is by way of these flues that heated air is admitted to the chamber of the oven for heating it. Heat admitted to the oven is allowed to pass out of the oven or vent in the usual manner.

Arranged alongside the superposed chambers 1, 2 and 3 is a stove top 10 having beneath it a burner chamber 11 containing various burners (not shown). Below the burner chamber 11 is an air inlet chamber 12 through which air from outside the stove is supplied to the respective burners within the burner chamber 11, all as more completely shown and described in my copending application, Serial No. 162,970 filed of even date herewith. Heated air within the burner chamber 11 has permitted escape therefrom into the flue 5 by way of an opening 14, which is a further detail of the construction shown and described in my said application.

In the space left below the chamber 12, alongside the chambers 2 and 3, is formed another chamber 15 which, as presently to be explained, is a hot air chamber within which is built the incinerator. The chamber 15 is formed of various plates. Of these its top wall is the plate 16 which forms the bottom of the air inlet chamber 12. 17 is the back wall of the chamber 15 which forms also a part of the back of the stove. 18 is its outer side wall. On its inner side the chamber extends along the flue 5 adjacent the burner chamber 2, and also extends along the inner side of the hot chamber 3 with which it is in open communication. One of the plates assisting in the formation of the flue 5 is, however, preferably extended down by a portion 19 to form a partition between the hot chamber 3 and the chamber 15 and in this partition large openings 20 are formed in order that the chamber 15 and the hot chamber 3 may at all times be in open communication with one another. At the front the chamber 15 is formed by the plate 21 forming a part of the front of the stove and at the bottom the chamber is formed by a plate 22 forming a part of the bottom of the stove.

The chamber 15 thus formed and connecting with the hot chamber 3 is a hot air chamber separate from the incinerator which is built within it, but sealed from it, the heat from the incinerator acting to heat air contained within the chamber 15. For supplying the chamber 15 with air to be heated by the incinerator openings 23 are formed in the bottom plate 22 of the chamber. These openings lie outside the incinerator structure now to be described.

Built within the chamber 15 around a portion of the plate 21 which forms the front of this chamber, is an incinerator casing 25 consisting of a number of upright connected plates resting on the bottom plate 22 of the chamber 15 and making closed connection with its front plate 21. Mounted upon the casing 25 and making closed connection therewith and with the front plate 21 is a head or dome 26 which together with the casing forms an auxiliary chamber 27 inside the chamber 15 and this auxiliary chamber, closed from the chamber 15, is the chamber in which the incineration is carried on. Outlet from the chamber 27 is provided by way of a smoke pipe 28, the casing or dome being formed or moulded to make closed connection with this pipe. The smoke pipe extends outwardly through the chamber 15 and through the rear wall 17 of this chamber and is thence extended to a chimney.

29 represents the grate of the incinerator. This grate rests upon flanges 30 extending from the inside of the casing 25 and front plate 21 which encloses the grate. The grate is arranged to lie some little distance above the bottom plate 22, and disposed to rest upon this plate below the grate is a removable ashpan 31. Above the grate 29 resting thereon and outturned to bear at their upper ends against the surrounding casing 25 and front plate 21 are a set of slotted plates 32 which co-operate with one another and with the grate to form the firepot of the incinerator structure. It will be understood in this connection that the grate together with these plates are preferably detachable parts, being simply laid in place. Extending upwardly through the grate and centrally located at the bottom of the firepot thus formed is a gas burner 33 to which a mixture of primary air and gas is admitted by way of a supply pipe 34 led in through a mixing chamber 34' in the side of the stove.

Formed within the lower portion of the front plate 21, enclosed by the casing 25 of the incinerator structure, is an opening 35 closed by a hinged door 36. This opening is of sufficient size to allow inspection of the firepot of the incinerator when the door is open, or permit lighting of the burner, and also gives access to the ashpit for insertion or removal of the ashpan. This opening provides also for admission of secondary air to the burner and to the firepot for burning matter deposited therein. The door 36 is normally closed and admission of air is provided for by means of openings 37 in the door controlled by a slide 38 by which the amount of admitted air is regulated.

The opening 35 in the front plate 21 affords access only to the chamber 27 of the incinerator. Arranged above this opening and also located in the front plate 21 is another opening 40 which provides access to the hot air chamber 15 and through this chamber to the dome 26 of the incinerator structure. The opening 40 is controlled by a hinged door 41. It is through this opening 40, when the door is opened, that refuse to be burned is deposited within the incinerator. To this end the dome 26 of the incinerator is provided with an opening 42. This opening in the dome is normally closed by a hinged door or trap 43. The disposition of this door or trap with relation to the opening 40 through the front plate 21 is such that when the door or trap 43 is open it will extend outwardly through the opening 40 in the front plate resting upon the bottom edge 44 thereof in an inclined position, thereby forming a chute by which refuse deposited thereon will be directed into the chamber of the incinerator. To prevent refuse from sliding off the door or trap 43 when operating as a chute the door is provided along either side with deep flanges 45. These flanges will not interfere with the closing of the door and will lie, when the door or trap is closed, in an out of the way position within the cavity of the dome of the incinerator structure.

Of course considerable dry matter will be burned within the incinerator, which will not necessitate the lighting of the gas burner 33. When, however, the refuse will not readily burn, then the burner 33 is lighted for effecting the combustion of such refuse or matter, although for purposes of heating the burner may be lighted at any time when no refuse to be burned is contained within the incinerator.

When refuse is being burned within the incinerator, gases resulting from such burning will pass directly into the chimney through the smoke pipe 28 without in any way contaminating the air in the hot air chamber 15 surrounding the incinerator structure.

Air within the hot air chamber 15 becomes intensely heated on account of the burning or combustion inside the incinerator forming practically as it does a hot air stove, the casing and dome forming its exterior structure becoming very hot and thereby heating the air within the chamber 15. Air thus heated within the hot air chamber 15 will pass out of this chamber into the hot chamber 3 for keeping hot articles placed within this chamber; thence will pass upwardly out of this chamber by way of the flues 4 and 5 to the oven for heating or assisting in heating the oven, and thence will escape from the oven in the usual manner. The hot air chamber 15 also performs a further useful function in preheating the air admitted to the open burners below which the chamber is arranged. In other words, the hot air chamber 15 lies below the chamber 12 through which air is being admitted to the open burners, the two chambers being separated by a plate common to both.

Having thus fully described my invention, I claim and desire to secure by Letters Patent of the United States:—

1. A gas range having within it a chamber fronted by a portion of the exterior wall of the range, an incinerator casing with dome arranged within said chamber making closed connection with a portion of the front wall of said chamber with smoke pipe leading outwardly through said chamber, said dome having an opening through it, an incinerator located inside the enclosure of said casing and dome, means whereby access may be had to the incinerator and air admitted thereto through that portion of the exterior wall of the range fronting the incinerator casing, means whereby access may be had to the dome of the incinerator casing through the exterior wall of the range fronting said chamber, and a movable door closing the opening through said dome.

2. A gas range having within it a chamber fronted by a portion of the exterior wall of the range, an incinerator casing with dome arranged within said chamber making closed connection with a portion of the front wall of said chamber with smoke pipe leading outwardly through said chamber, said dome having an opening through it, an incinerator located inside said casing and dome and comprising a firepot, a burner therein, means whereby a mixture of primary air and gas may be admitted and directed to said burner from outside said chamber, means whereby secondary air may be admitted to said burner and firepot through that portion of the exterior wall of the range fronting the incinerator casing, means whereby access may be had to the dome of the incinerator casing through the exterior wall of the range fronting said chamber, and a movable door closing the opening through said dome.

3. A gas range having within it a chamber fronted by a portion of the exterior wall of the range, an incinerator casing with dome arranged within said chamber making closed connection with a portion of the front wall of said chamber with smoke pipe leading outwardly through said chamber, an incinerator located within said casing and dome, means whereby access may be had to the incinerator and air admitted thereto through that said portion of the exterior wall of the range fronting the incinerator casing, a door controlling an opening through that portion of the exterior wall of the range fronting said chamber by which access may be had to the dome of the incinerator casing when the door is open, a movable door adapted when closed to close an opening in said dome and when open to extend outwardly through the said opening in the exterior wall of the range providing access to the dome and forming a chute leading through said opening in the exterior wall of the range to the opening in the dome, and means for supporting said last-named door.

4. In a gas range having an oven, a flue leading to the oven for directing hot air thereto for heating it, the combination there with of a hot air chamber in open communication with said flue, said chamber having an opening therein for admission of air, an incinerator casing with dome closed from said hot air chamber with smoke pipe leading outwardly through said chamber to a point outside the range, said casing and dome providing a heat-radiating surface or shell for heating air admitted to said hot air chamber, an incinerator arranged inside said casing and dome for heating them when the incinerator is in operation, and means whereby the incinerator may be operated.

5. In a gas range, the combination comprising a warming chamber having an outlet for heated air admitted to said chamber, a hot air chamber in open communication with said warming chamber, said hot air chamber having openings therein for admission of air, an incinerator casing with dome closed from said hot air chamber with smoke pipe leading outwardly through said chamber to a point outside the range, said casing and dome providing a heat-radiating surface or shell for heating air admitted to said hot air chamber, an incinerator arranged inside said casing and dome for heating them when the incinerator is in operation, and means whereby the incinerator may be operated.

6. In a gas range, the combination comprising an oven, a burner chamber arranged beneath the oven, a warming chamber arranged beneath the burner chamber, a flue leading from the warming chamber by the burner chamber and through which flue heated air may be directed to the oven for purposes of heating either from the burner chamber or from the warming chamber, a hot air chamber arranged alongside and in open communication with said warming chamber, said hot air chamber having openings therein for admission of air, an incinerator casing with dome closed from said hot air chamber with smoke pipe leading outwardly through said chamber to a point outside the range, said casing and dome providing a heat-radiating surface or shell for heating air admitted to said hot air chamber, an incinerator arranged inside said casing and dome for heating them when the incinerator is in operation, and means whereby the incinerator may be operated.

7. A gas range having an open top with burner chamber arranged beneath said top, an air inlet chamber beneath the burner chamber and through which air is directed to pass to the burner chamber, a hot air chamber arranged beneath the air inlet chamber with plate separating the two chambers common to both, said hot air chamber having an outlet and opening in it for admission of air, an incinerator casing with dome closed from said hot air chamber with smoke pipe leading outwardly through said chamber to a point outside the range, said casing and dome providing a heat-radiating surface or shell for heating air admitted to said hot air chamber, an incinerator arranged inside said casing and dome for heating them when the incinerator is in operation, and means whereby the incinerator may be operated.

SAMUEL A. WILDE.